(12) United States Patent
Li et al.

(10) Patent No.: US 11,880,758 B1
(45) Date of Patent: Jan. 23, 2024

(54) RECURRENT NEURAL NETWORK CLASSIFIER

(71) Applicant: Waymo LLC, Mountain View, CA (US)

(72) Inventors: Congcong Li, Cupertino, CA (US); Ury Zhilinsky, Foster City, CA (US); Yun Jiang, Sunnyvale, CA (US); Zhaoyin Jia, Sunnyvale, CA (US)

(73) Assignee: Waymo LLC, Mountain View, CA (US)

( * ) Notice: Subject to any disclaimer, the term of this patent is extended or adjusted under 35 U.S.C. 154(b) by 152 days.

(21) Appl. No.: 17/391,627

(22) Filed: Aug. 2, 2021

Related U.S. Application Data

(63) Continuation of application No. 15/381,389, filed on Dec. 16, 2016, now Pat. No. 11,093,819.

(51) Int. Cl.
| | | |
|---|---|---|
| G06N 3/04 | (2023.01) | |
| G06N 3/08 | (2023.01) | |
| G06N 3/044 | (2023.01) | |
| G06N 3/045 | (2023.01) | |

(52) U.S. Cl.
CPC ............. *G06N 3/044* (2023.01); *G06N 3/045* (2023.01); *G06N 3/08* (2013.01)

(58) Field of Classification Search
CPC ....... G06N 3/044; G06N 3/045; G06N 3/0455
See application file for complete search history.

(56) References Cited

U.S. PATENT DOCUMENTS

| | | | |
|---|---|---|---|
| 5,541,590 | A | 7/1996 | Nishio |
| 6,208,963 | B1 | 3/2001 | Martinez et al. |
| 7,672,920 | B2 | 3/2010 | Ito et al. |
| 9,015,093 | B1 | 4/2015 | Commons |
| 9,760,806 | B1 | 9/2017 | Ning et al. |
| 9,989,964 | B2 | 6/2018 | Berntorp et al. |
| 10,013,640 | B1 | 7/2018 | Angelova et al. |
| 2003/0233233 | A1 | 12/2003 | Hong |

(Continued)

OTHER PUBLICATIONS

Cho, Hyunggi, et al. "A multi-sensor fusion system for moving object detection and tracking in urban driving environments." 2014 IEEE International Conference on Robotics and Automation (ICRA). IEEE, 2014. (Year: 2014).*

(Continued)

*Primary Examiner* — Hal Schnee
(74) *Attorney, Agent, or Firm* — Fish & Richardson P.C.

(57) ABSTRACT

Disclosed herein are neural networks for generating target classifications for an object from a set of input sequences. Each input sequence includes a respective input at each of multiple time steps, and each input sequence corresponds to a different sensing subsystem of multiple sensing subsystems. For each time step in the multiple time steps and for each input sequence in the set of input sequences, a respective feature representation is generated for the input sequence by processing the respective input from the input sequence at the time step using a respective encoder recurrent neural network (RNN) subsystem for the sensing subsystem that corresponds to the input sequence. For each time step in at least a subset of the multiple time steps, the respective feature representations are processed using a classification neural network subsystem to select a respective target classification for the object at the time step.

20 Claims, 4 Drawing Sheets

(56) References Cited

U.S. PATENT DOCUMENTS

| | | |
|---|---|---|
| 2012/0036097 A1 | 2/2012 | Prokhorov et al. |
| 2017/0024877 A1 | 1/2017 | Versace et al. |
| 2017/0092297 A1 | 3/2017 | Sainath et al. |
| 2018/0157963 A1 | 6/2018 | Salti et al. |
| 2019/0188572 A1 | 6/2019 | Lanctot et al. |

OTHER PUBLICATIONS devblogs.nvidia.com [online] "End-to-End Deep Learning for Self-Driving Cars," Aug. 17, 2016, retrieved on Aug. 24, 2018, retrieved from URL< https://devblogs.nvidia.com/deep-learning-self-driving-cars/> 16 pages.

Jain, Ashesh, et al., "Recurrent neural networks for driver activity anticipation via sensory-fusion architecture," 2016 IEEE International Conference on Robotics and Automation, Jun. 2016, 8 pages.

medium.com [online] "Training a neural network in real-time to control a self-driving car," Dec. 10, 2016, retrieved on Aug. 24, 2018, retrieved from URL< https://medium.com/@tantony/training-a-neural-network-in-real-time-to-control-a-self-driving-car-9ee5654978b7> 6 pages.

Nishida, "Multimodal gesture recognition using multi-stream recurrent neural network," Image and Video Technology, Nov. 2015, pp. 682-694.

Santana et al., "Learning a Driving Simulator," arXiv 1608.01230v1, Aug. 3, 2016, 8 pages.

Socher et al., "Convolutional-Recursive Deep Learning for 3D Object Classification," Advances in Neural Information Processing Systems, 2012, 9 pages.

www.princeton.edu [online] "Deep Learning for Self-Driving Car," Oct. 26, 2020 Aug. 24, 2018, retrieved from URL< www.princeton.edu/~alaink/Orf467F14/Deep%20Driving.pdf> 32 pages.

\* cited by examiner

RECURRENT NEURAL NETWORK CLASSIFIER

CROSS-REFERENCE TO RELATED APPLICATIONS

This application is a continuation of U.S. application Ser. No. 15/381,389, filed Dec. 16, 2016, the entire contents of which are incorporated by reference herein.

TECHNICAL FIELD

This specification relates to generating a target classification for an object from a sequence of inputs, e.g., using a neural network system provided on an autonomous vehicle.

BACKGROUND

Neural networks are machine-learning models that employ multiple layers of operations to predict one or more outputs from one or more inputs. Neural networks typically include one or more hidden layers situated between an input layer and an output layer. The output of each layer is used as input to another layer in the network, e.g., the next hidden layer or the output layer.

Each layer of a neural network specifies one or more transformation operations to be performed on input to the layer. Some neural network layers have operations that are referred to as neurons. Each neuron receives one or more inputs and generates an output that is received by another neural network layer. Often, each neuron receives inputs from other neurons, and each neuron provides an output to one or more other neurons.

An architecture of a neural network specifies what layers are included in the network and their properties, as well as how the neurons of each layer of the network are connected. In other words, the architecture specifies which layers provide their output as input to which other layers and how the output is provided.

The transformation operations of each layer are performed by one or more computers at one or more locations having installed software modules that implement the transformation operations. Thus, a layer being described as performing operations means that the computers implementing the transformation operations of the layer perform the operations.

Neural networks have been trained to perform various tasks such as speech recognition, language translation, and natural language predictions.

SUMMARY

This specification describes systems, methods, devices, and other techniques for processing sensor data to classify one or more objects represented in the sensor data. In some implementations, the sensor data can originate from one or more sensing subsystems on a vehicle, e.g., an autonomous or semi-autonomous vehicle. The sensor data can characterize information about the environment in a vicinity of the vehicle, including information about one or more objects in the vicinity of the vehicle.

The classification for an object represented in the sensor data can be generated using a neural network system. The neural network system can include a pre-processing subsystem, a respective encoder subsystem for each sensing subsystem on the vehicle, and a classification subsystem. The pre-processing subsystem receives sensor data from the sensing subsystems and converts the sensor data to encoder inputs. The encoder subsystems process the encoder inputs to generate feature representations of the encoder inputs. The encoder inputs can then be concatenated and processed by the classification subsystem to generate a target classification of an object represented in the sensor data.

Some implementations of the subject matter disclosed herein include a computer-implemented method for generating target classifications for an object from a set of input sequences. Each input sequence includes a respective input at each of multiple time steps, and each input sequence corresponds to a different sensing subsystem of multiple sensing subsystems. For each time step in the multiple time steps and for each input sequence in the set of input sequences, a respective feature representation is generated for the input sequence by processing the respective input from the input sequence at the time step using a respective encoder recurrent neural network (RNN) subsystem for the sensing subsystem that corresponds to the input sequence. For each time step in at least a subset of the multiple time steps, the respective feature representations for the set of input sequences at the time step are processed using a classification neural network subsystem to select a respective target classification for the object at the time step.

These and other implementations can optionally include one or more of the following features.

The respective inputs of each input sequence can characterize signals sensed by the corresponding sensing subsystem for the input sequence, the signals indicating information about the object.

The sensing subsystems can be physically coupled to an autonomous street vehicle and include at least one of a light detection and ranging (LIDAR) subsystem, a radio detection and ranging (RADAR) subsystem, or a photographic subsystem. The object can be an object that has been detected as being within a sensing range of the autonomous street vehicle.

For each time step in at least the subset of the multiple time steps, the classification neural network subsystem can select the respective target classification for the object at the time step from a set of candidate classifications that include two or more of street sign, vehicle, pedestrian, traffic cone, facility, and vegetation.

The subset of the multiple time steps can include every time step in the multiple time steps such that the classification neural network subsystem selects a respective target classification for the object at each time step in the multiple time steps.

The subset of the multiple time steps can include only one or more second time steps that follow one or more first time steps in the multiple time steps such that the classification neural network subsystems defers selection of any target classification for the object until the one or more second time steps.

For each time step in the multiple time steps and for each input sequence in the set of input sequences, generating the respective feature representation for the input sequence by processing the respective input from the input sequence at the time step using the respective encoder RNN subsystem for the RNN subsystem that corresponds to the input sequence can include updating a current hidden state of the respective encoder RNN subsystem based on the respective input from the input sequence at the time step. The respective feature representation for the input sequence at the time step can be the updated hidden state of the respective encoder RNN subsystem at the time step.

The system can identify that the object targeted for classification at a particular time step is changed from the object targeted for classification at a preceding time step, and in response, the hidden states of the encoder RNN subsystems can be reset to a default hidden state before processing the respective inputs at the particular time step.

Processing the respective feature representation for the set of input sequences at a given time step to select a target classification for the object at the given time step can include (i) processing the respective feature representations for the set of input sequences using a softmax layer of the classification neural network subsystem to generate a respective score for each candidate classification in a set of candidate classifications, and (ii) selecting the target classification from the set of candidate classifications based on the scores.

The classification neural network subsystem can include a feedforward neural network.

The classification neural network subsystem can include a recurrent neural network.

Some implementations of the subject matter disclosed herein include a computer-implemented method for training a neural network system that includes multiple encoder recurrent neural network (RNN) subsystems and a classification neural network subsystem. A training system obtains multiple training data sets, wherein each training data set includes (i) a set of input sequences that each comprises a respective training input at each of multiple time steps and (ii) a target training classification for an object represented by the respective inputs of each of the set of input sequences. Training the neural network system on the multiple training data sets includes, for each training data set and for each time step in the multiple time steps: (i) processing the respective inputs of the set of input sequences at the time step using the multiple encoder RNN subsystems to generate respective feature representations for the set of input sequences at the time step, (ii) processing the respective feature representations for the set of input sequences at the time step using the classification neural network subsystem to generate a predicted classification for the object, (iii) determining an error between the target training classification of the training data set and the predicted classification for the object, and (iv) adjusting current values of parameters of the neural network system using the error.

These and other implementations can optionally include one or more of the following features.

The respective inputs of each input sequence in a given training data set can characterize signals sensed by a respective sensing subsystem, of multiple sensing subsystems, that corresponds to the input sequence, the signals indicating information about the object.

For each training data set and for each time step in the multiple time steps, the system can adjust current values of parameters of the multiple encoder RNN subsystems using errors between one or more target feature representations and the generated feature representations for the set of input sequences at the time step.

For each time step in the multiple time steps and for each input sequence in the set of input sequences for a given training data set, the system can process the respective inputs of the set of input sequences at the time step using the multiple encoder RNN subsystems to generate respective feature representations for the set of input sequences at the time step comprises updating respective current hidden states of the multiple encoder RNN subsystems based on the respective inputs of the set of input sequences at the time step. The respective feature representation for each input sequence at the time step can be the updated hidden state of a corresponding encoder RNN subsystem at the time step.

For each training data set and for each time step in the multiple time steps, processing the respective feature representations for the set of input sequences at the time step using the classification neural network subsystem to generate a predicted classification for the object can include (i) processing the respective feature representations for the set of input sequences using a softmax layer of the classification neural network subsystem to generate a respective score for each candidate classification in a set of candidate classifications, and (ii) selecting the predicted classification from the set of candidate classifications based on the scores.

Some implementations of the subject matter disclosed herein include a neural network system for generating target classifications for an object from a set of input sequences. Each input sequence can include a respective input at each of multiple time steps and can correspond to a different sensing subsystem of multiple sensing subsystems. The system can include multiple encoder recurrent neural network (RNN) subsystems and a classification neural network subsystem. Each of the multiple encoder RNN subsystems is configured to generate at each time step a feature representation for a particular input sequence of the multiple input sequences by processing the respective input from the particular input sequence at the time step. Each input sequence of the multiple input sequences is processed by a different one of the multiple encoder RNN subsystems. The classification neural network subsystem is configured to process, at each of one or more time steps of the multiple time steps, the respective feature representations for the set of input sequences at the time step to select a respective target classification for the object at the time step.

These and other implementations can optionally include one or more of the following features.

The classification neural network subsystem can include a combination subsystem, a scoring subsystem, a selection subsystem, or a combination of two or more of these. The combination subsystem is configured to generate, at each of the one or more time steps, a combined feature representation for the set of input sequences at the time step using the respective feature representations for each of the input sequences at the time step. The scoring subsystem is configured to generate, at each of the one or more time steps and using the combined feature representation, a respective score for each candidate classification in a set of candidate classifications. The selection subsystem is configured to select, at each of the one or more time steps, a target classification for the object based on the scores.

The scoring subsystem comprises can include a softmax layer.

Implementations of the subject matter described herein can, in certain instances, realize one or more advantages. By using recurrent subsystems to process each channel of sensor data from a different sensing subsystem, more accurate classifications may be achieved based on the memory of inputs from preceding time steps. Additionally, the system may obviate any need for human intervention to determine how the respective feature representations of the encoder inputs for each sensor channel should be combined in order to facilitate accurate classifications of an object. Instead, the classification subsystem and the encoder subsystems of the neural network system may be trained in conjunction with each other so that the system automatically learns optimal parameters for combining the respective encoder inputs.

DETAILED DESCRIPTION

This specification describes systems, methods, devices, and other techniques for using a neural network system to generate a classification for an object. In some implementations, the neural network system is provided on a vehicle, e.g., an autonomous or semi-autonomous vehicle, so that the vehicle can use the system to classify objects that are detected as being within a vicinity of the vehicle. For example, the system may classify objects to distinguish among vehicles, pedestrians, vegetation, road signs, and buildings located near the vehicle. In some implementations, the classification for an object can be provided for processing by one or more other systems on the vehicle to facilitate human-directed or autonomous driving tasks, e.g., collision avoidance and route planning.

The neural network system can include one or more "fully-learned" machine-learning models, i.e., models that generate output based solely on parameters that have been learned by processing training data rather than through human-programmed decision logic.

Figure 1:
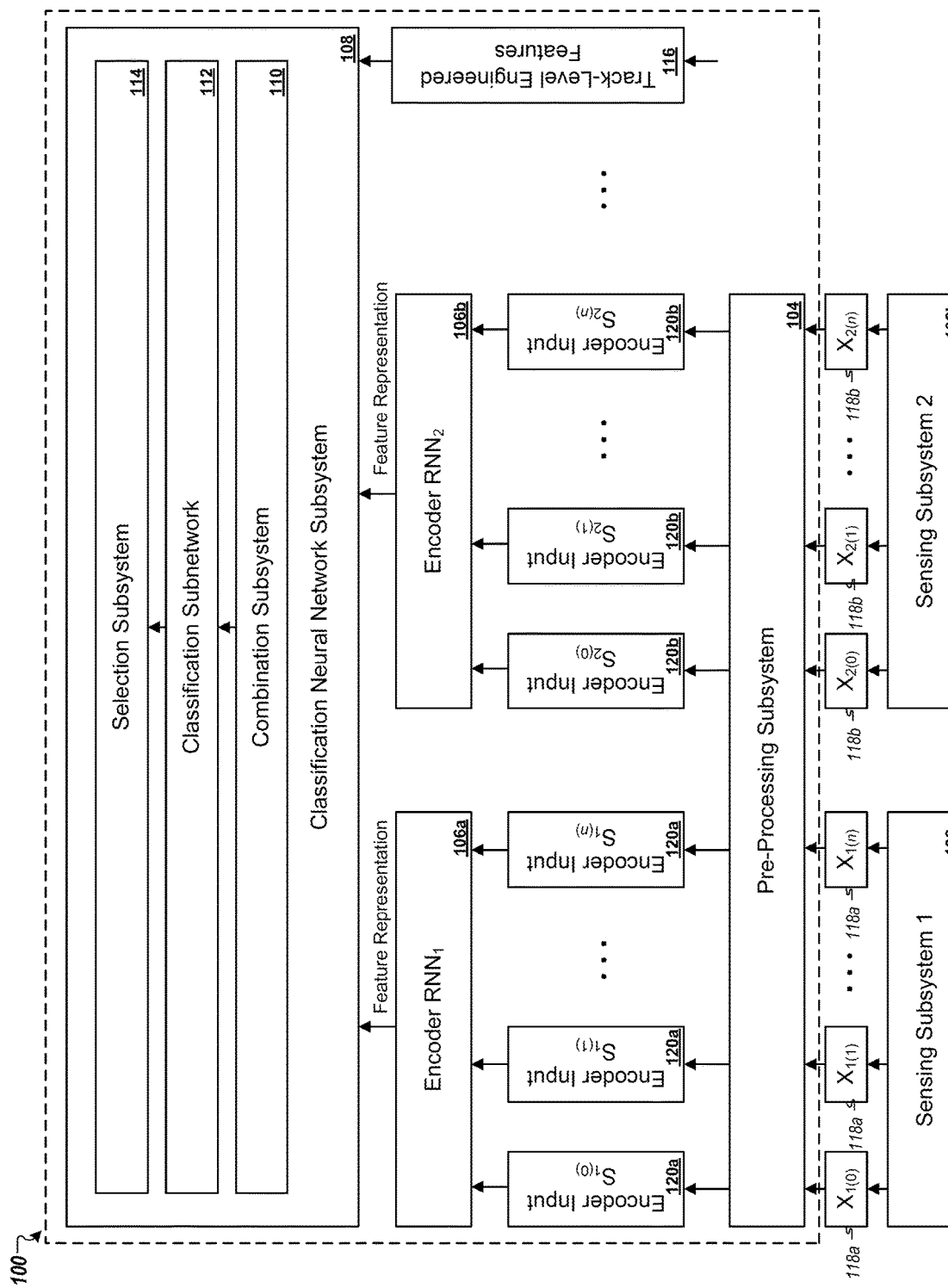
FIG. 1 is a block diagram of an example neural network system that receives inputs from multiple sensing subsystems and processes the inputs to generate object classifications for one or more objects represented in the inputs.

Referring to FIG. 1, a block diagram is shown of an example neural network system 100 that generates object classifications using one or more channels of sensor data from one or more sensing subsystems 102. The system 100 can be implemented as one or more computer programs on one or more computers in one or more locations.

In some implementations, the system 100 is an on-board neural network system that is physically located on a vehicle. The vehicle can be an automobile, a motorcycle, a boat, or any other appropriate type of vehicle. The vehicle can be a fully autonomous vehicle that makes fully-autonomous driving decisions, including control and navigation decisions. Alternatively, the vehicle can be a semi-autonomous vehicle that makes driving decisions to aid a human driver. For example, the vehicle can autonomously apply the brakes if a vehicle navigation prediction indicates that a human driver is about to collide with another vehicle. As an on-board system, the system 100 may include components that travel along with the vehicle such as power supplies, computing hardware, and sensors. The components may be permanently or removably fixed to an interior of the vehicle, an exterior of the vehicle, or both.

The system 100 is configured to process one or more channels of sensor data that indicate information about an object to generate a classification for the object. In some implementations, the respective sensor data from each channel is sensed by a different sensing subsystem 102 of multiple sensing subsystems that are provided on-board a vehicle. The sensing subsystems 102 may include a combination of components that facilitate detection of objects in the vicinity of a vehicle. For example, a first sensing subsystem 102a may be a light detection and ranging (LIDAR) system that emits and detects reflections of laser light, and the second sensing subsystem 102b may be a radio detection and ranging (RADAR) system that emits and detects reflections of radio waves. Additional sensing subsystems 102 may also be provided on a vehicle (not shown in FIG. 1), such as a camera system that detects reflections of visible light.

The vehicle may include combinations of two, three, four, or more sensing subsystems 102, and particular ones of the sensing subsystems 102 may be activated or deactivated at any time during travel of the vehicle. In some instances, the vehicle may include two or more sensing subsystems 102 of the same type (e.g., two or more LIDAR systems, two or more RADAR systems, two or more camera systems), although each subsystem 102 is configured differently from each other. For example, the first sensing subsystem 102a may be a short-range LIDAR system that senses information about an environment in close proximity to the vehicle, whereas the second sensing subsystem 102b may a longer-range LIDAR system that senses information about the environment at a further distance from the vehicle.

In some implementations, all or some of the sensing subsystems 102 are configured to run continuously and concurrently during travel of a vehicle. At any given time, the sensing subsystems 102 may make multiple channels of sensor data available to the neural network system 100 that each represents a current condition of the environment of the vehicle, including any objects in the environment, according to signals captured by one or more sensors of the respective sensing subsystem 102.

The sensing subsystems 102 are configured to output sensor data 118. The sensor data 118 may be raw sensor data that indicates, for example, a distance of reflected radiation (e.g., laser light, radio waves, or visible light) a direction of the reflected radiation, an intensity of the reflected radiation, or a combination of these. Each of the sensing subsystems 102 can transmit one or more pulses of electromagnetic radiation in a particular direction and can measure the intensity of any reflections as well as the elapsed time between emitting the radiation and receiving the reflective signal. A distance between an object in the environment and the current position of the vehicle can be determined based on the elapsed time between emitting the radiation and receiving the reflective signal. The sensing subsystems 102 can each continually sweep a particular space in angle, azimuth, or both. Sweeping in azimuth, for example, can allow a sensing subsystem 102 to detect multiple objects along a same line of sight.

The sensing subsystems 102 provide their respective channel of sensor data 118 to a pre-processing subsystem 104. The pre-processing subsystem 104 processes the channels of sensor data 118 to generate inputs to a set of encoder recurrent neural networks (RNNs) 106. Generally, the pre-processing subsystem 104 receives a respective frame of sensor data 118 from each of the sensing subsystems 102 periodically or otherwise on a regular basis.

More formally, the pre-processing subsystem 104 receives and processes a respective frame of sensor data 118 from each of the sensing subsystems 102 at each time step in a series of time steps. For example, as FIG. 1 depicts, the pre-processing subsystem 104 receives frames of sensor data 118a ($X_{1(0)}$-$X_{1(n)}$) from a first sensing subsystem 102a at each time step 0-n, and also receives frames of sensor data 118b ($X_{2(0)}$-$X_{2(n)}$) from a second sensing subsystem 102b at each of the time steps 0-n. For each time step, the pre-processing subsystem 104 processes the respective frames of sensor data 118 from each sensing subsystem 102 to generate a respective encoder input 120 to the particular encoder RNN 106 that corresponds to the sensing subsystem 102. For instance, for time step 0, the pre-processing subsystem 104 generates encoder input $S_{1(0)}$ based on sensor data $X_{1(0)}$ from the first sensing subsystem 102a, and also generates encoder input $S_{2(0)}$ based on sensor data $X_{2(0)}$ from the second sensing subsystem 102b.

The respective frames of sensor data 118 provided by each sensing subsystem 102 over successive time steps forms a sequence of frames of sensor data 118. For instance, frames 118a ($X_{1(0)}$-$X_{1(n)}$) form a first sequence of sensor data over time steps 0-n, while frames 118b ($X_{2(0)}$-$X_{2(n)}$) form a second sequence of sensor data over time steps 0-n. A particular frame of sensor data 118 at a given time step for a given one of the sensing subsystems 102 can represent the result of a single sweep of the vehicle's environment by the sensing subsystem 102, e.g., a 360-degree sweep around the vehicle. Alternatively, the sensor data 118 at a given time step for a given sensing subsystem 102 can represent the result of a partial sweep of the vehicle's environment by the sensing subsystem 102 or multiple sweeps of the vehicle's environment by the sensing subsystem 102. In some implementations, the result of a sweep by a given sensing subsystem can be projected onto a 2-dimensional space, and the frame of sensor data 118 represents the 2d projection of the sweep (e.g., LIDAR or RADAR sweeps may be projected to a 2D space that corresponds to the environment in a vicinity of a vehicle).

The pre-processing subsystem 104 can optionally perform one or more operations to generate encoder inputs 120 from the frames of sensor data 118.

In some implementations, the pre-processing subsystem 104 uses an object detection subsystem (not shown) to detect one or more objects in a frame of sensor data 118. For example, the object detection subsystem may process the results of a single LIDAR sweep to detect multiple objects in vicinity of the vehicle. The object detection subsystem may be configured to detect positions of objects relative to the vehicle, but may not be configured to generate classifications that indicate categories or types for the detected objects.

In some implementations, the pre-processing subsystem 104 crops frames of sensor data 118 to isolate, for a given frame, a portion of the frame that corresponds to a particular target object that is to be classified. For example, a full frame of sensor data 118 may show a collection of multiple objects in the vicinity of a vehicle. The pre-processing subsystem 104 selects one of the objects as a target for classification and may then crop the frame to include information about the selected object, to the exclusion of information about other objects. The pre-processing subsystem 104 may then generate the encoder input 120 for a given time step on the basis of the cropped frame of sensor data 118 rather than on the full frame of sensor data 118. Additionally, or alternatively, the sensing subsystems 102 may be configured to directly output frames of sensor data 118 that initially represent information about only a particular object targeted for classification, rather than outputting frames that, e.g., represent information about the environment of the vehicle more broadly.

In some implementations, the pre-processing subsystem 104 tracks objects over time and correlates objects that appear in frames of sensor data 118 over multiple time steps. For example, the pre-processing subsystem 104 may detect that the same object appears in each frame of sensor data 118 ($X_{1(0)}$ through $X_{1(n)}$) from the first sensing subsystem 102a and in each frame of sensor data 118 ($X_{2(0)}$ through $X_{2(n)}$) from the second sensing subsystem 102b. The pre-processing subsystem 104 can then crop each of these frames to isolate the respective portions of the frames that pertain to the same object. A collection of encoder inputs 120 generated over multiple time steps that represent the same object is referred to herein as a 'track'. For instance, a particular vehicle that drives for a period of time immediately behind or adjacent to a first vehicle that includes the onboard neural network system 100 may appear in frames of sensor data 118 over many time steps. The respective encoder inputs 120 generated from these frames of sensor data 118 form a 'track' for the second vehicle. Although the encoder inputs 120 within a particular track may all characterize information about the same object, the encoder inputs generally do not specify what the object is (e.g., the encoder inputs do not specify a classification of the object).

In some implementations, the pre-processing subsystem 104 provides information to the encoder RNNs 106 that indicates the beginning of a new track, the end of a track, or both. For example, if the encoder inputs 120 generated by the pre-processing subsystem 104 at a given time step represent information about a different object than the object represented by the encoder inputs 120 at an immediately preceding time step, then the pre-processing subsystem 104 can alert the encoder RNNs 106 of the beginning of a new track at the given time step. If the encoder inputs 120 generated by the pre-processing subsystem 104 at a given time step represent information about the same object as that represented by the encoder inputs 120 at an immediately preceding time step, then the pre-processing subsystem 104 may not alert the encoder RNNs 106 or, optionally, may alert the RNNs that the encoder inputs 120 at the given time step are a continuation of the same track from the inputs 120 at the immediately preceding time step.

The neural network system 100 includes a respective encoder RNN 106 for each sensing subsystem 102. RNNs, such as the encoder RNNs 106, are neural networks that are configured to receive an input sequence and to generate an output from the input sequence. In some implementations, RNNs are configured to generate an output sequence from an input sequence. RNNs, such as the encoder RNNs 106, can include one or more layers of nonlinear units (e.g., one or more hidden layers and an output layer) which, when trained, are configured to generate target outputs responsive to input sequences (e.g., encoder inputs 120). An RNN may maintain an internal, time-variant state, e.g., a hidden state, and some or all of the internal state of the RNN from a previous time step can be used in computing an output at a current time step. Generally, the internal state of an RNN is updated at each time step of an input sequence as a result of processing the respective input from the input sequence at the time step.

In some implementations, the encoder RNNs 106 may be long short-term (LSTM) neural networks that each includes one or more LSTM memory blocks. Each LSTM memory block can include one or more cells that each includes an input gate, a forget gate, and an output gate that allow the cell to store previous states for the cell, e.g., for use in generating a current activation or to be provided to other components of the LSTM neural network.

Each encoder RNN 106 is configured to process a sequence of encoder inputs 120, which the pre-processing subsystem 104 has derived from the frames of sensor data 118 from the sensing subsystem 102 that corresponds to the encoder RNN 106, to generate feature representations of the encoder inputs 120. In some implementations, the feature representation generated by an encoder RNN 106 at a given time step is the hidden state of the encoder RNN 106 that results from processing the encoder input 120 at that time step. For example, the encoder RNN 106 may process an encoder input 120 at a given time step, and the feature representation for that time step is a collection of values that define the hidden state of the last hidden layer of the encoder RNN 106 after processing the encoder input 120.

The encoder RNNs 106 are configured to process a respective encoder input 120 at each time step of a track and to output a respective feature representation for each time step in at least a subset of the time steps of the track. At the start of each track of inputs (e.g., inputs that represent sensor data for the same object over multiple time steps), the hidden states of the encoder RNNs 106 can be reset to default states so that any memory of previously processed inputs from other tracks is erased. At each time step, each encoder RNN 106 then processes the respective encoder input 120 at the time step for the corresponding sensing subsystem 102 and updates the current hidden state of encoder RNN 106 based on the respective encoder input 120. Because the hidden states of the encoder RNNs 106 are maintained between each time step in a track, the hidden state that results from processing an encoder input 120 at each time step depends not only the current encoder input 120 but also on encoder inputs 120 that were processed at any preceding time steps in the track. For example, at time step 0, e.g., the start of a new track, first encoder RNN 106a may process encoder input $S_{1(0)}$ and second encoder RNN 106b may process encoder input $S_{2(0)}$ to update the respective hidden states of the RNNs 106a and 106b based on the respective inputs at this initial time step. At the next time step 1, the first encoder RNN 106a processes encoder input $S_{1(1)}$ and the second encoder RNN 106b processes encoder input $S_{2(1)}$ to update the respective hidden states of the RNNs 106a and 106b based on the respective inputs at this next time step. These operations can continue with each encoder RNN 106b processing a next input in the sequence to update the hidden states of the RNNs 106 until the end of a track is reached. If the pre-processing subsystem 104 indicates to the encoder RNNs 106 the start of a new track, the encoder RNNs 106 may reset their hidden states to the default state.

In some implementations, the encoder RNNs 106 output feature representations for processing by the classification neural network subsystem 108 at every time step in a track. In other implementations, the encoder RNNs 106 output feature representations for processing by the classification neural network subsystem 108 at fewer than all of the time steps in a track. The encoder RNNs 106 may delay outputting feature representations until a threshold number of encoder inputs 120 have been processed (i.e., until a threshold number of time steps have passed since the beginning of a track) or the encoder RNNs 106 may delay outputting feature representations until the entire sequence of encoder inputs 120 for a track has been processed. In other implementations, the encoder RNNs 106 may output feature representations at predetermined intervals, e.g., every 2, 5, 10, or 20 time steps. Similarly, the system 100 may generate classifications of an object for a track at these predetermined intervals.

Generally, the frequency at which the encoder RNNs 106 output feature representations can be a function of the frequency at which target classifications are desired. At each time step that the encoder RNNs 106 output feature representations, the classification neural network subsystem 108 can process the feature representations and generate a predicted object classification. Therefore, if a target classification is desired at every time step, the encoder RNNs 106a can make the feature representations available to the classification neural network subsystem 108 at every time step. In contrast, if a target classification is not needed until the end of a track, the encoder RNNs 106a can make the feature representations available to the classification neural network subsystem 108 only after the RNNs 106 have processed all the encoder inputs 120 for a track.

The classification neural network subsystem 108 is configured to process the feature representations from each of the encoder RNNs 106 to generate a target classification for an object represented by the encoder inputs 120. In some implementations, the classification neural network subsystem 108 is recurrent, e.g., the classification generated at a given time step is based not only on the feature representations at the given time step but also on the feature representations for one or more preceding time steps, the classification at a preceding time step, or both. In other implementations, the classification neural network subsystem 108 is feedforward, i.e., non-recurrent, e.g., the classification generated at a given time step is based only on the feature representations from the RNNs 106 at the given time step.

The classification neural network subsystem 108 can include multiple components, including a combination subsystem 110, a classification subnetwork 112, and a selection subsystem 114.

The combination subsystem 110 is configured to combine the respective feature representations from each encoder RNN 106 into a combined representation. In some implementations, the combination subsystem 110 combines the respective feature representations from each encoder RNN 106 by concatenating the respective feature representations. For example, at a given time step, the feature representation from encoder RNN 106a can be concatenated with the feature representation from encoder RNN 106b. Further feature representations from any additional encoder RNNs can also be concatenated, e.g., by appending the feature representations to each other. In some implementations, the combination subsystem 110 combines the respective feature representations from each encoder RNN 106 using matrix operations. For instance, the feature representations can each be a respective collection of values in a vector. The vectors for the feature representations can then be combined using matrix multiplication and one or more transpose vectors.

In some implementations, the combination subsystem 110 also combines the feature representations from each of the encoder RNNs 106 with track-level engineered features 116. These features 116 represent high-level semantic information of the object, such as object length, width speed, height, or a combination of these and other characteristics. The features 116 may be automatically determined by one or more other system components, or may be specified based on user input. Thus, in some instances, the combined representation of inputs can include both the feature representations from the encoder RNNs 106 and track-level engineered features 116.

The classification subnetwork 112 is a machine-learning model that is configured to process the combined representation of inputs corresponding to each of the sensing subsystems 102 and to generate, based on the combined representation, scores for possible classifications of the object represented by the inputs. The scores may indicate, for each classification in a dictionary of possible classifications, a likelihood that the possible classification is the true classification of the object. For example, dictionary of possible classifications may include street sign, vehicle, pedestrian, traffic cone, facility (e.g., building), and vegetation. If the object represented by the inputs is a minivan, then the score for the target classification of 'vehicle' should indicate a high likelihood for this classification relative to the other possible classifications.

In some implementations, the classification subnetwork 112 is a feedforward neural network. In other implementations, the classification subnetwork 112 is a recurrent neural network. The classification subnetwork 112 may include an input layer that accepts the combined representation of the inputs from the combination subsystem 110, and may further include one or more hidden layers, and an output layer. In some implementations, the classification subnetwork 112 includes a softmax layer that generates scores for each of the possible object classifications from the last hidden layer of the subnetwork 112.

Once the classification subnetwork 112 has generated a respective score for each of the possible classifications, the selection subsystem 114 selects one of the possible classifications as the target classification for the object based on the scores. For example, the selected classification may be the classification having a score that indicates the highest likelihood of being the true classification of the object.

FIGS. 2A-2D show example environments in the vicinity of a vehicle 202 at particular times $t_0$-$t_3$, respectively. The vehicle 202 is equipped with sensing subsystems 204 and an on-board neural network system 206. The sensing subsystems 204 perform regular sweeps of the vehicle's current environment to produce sensor data that includes information about objects in the vicinity of the vehicle 202. In some implementations, at each of the times $t_0$-$t_3$, each sensing subsystem 204 outputs a respective frame of sensor data for processing by the neural network system 206. A frame of sensor data can indicate the results of a sweep about at least a portion of the vehicle's surroundings by a particular sensing subsystem 204. The neural network system 206 processes the frames of sensor data from the sensing subsystems 204 at each time step and generates a target classification of an object at one or more of the time steps.

Figure 2A:
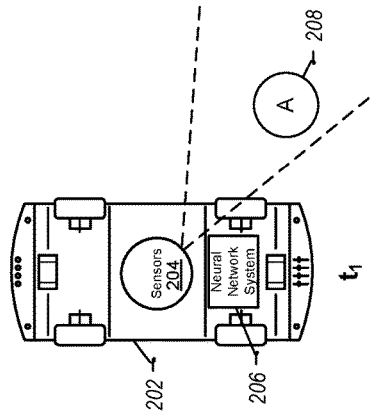
FIGS. 2A-2D show a vehicle using one or more sensing subsystems to detect objects in a vicinity of the vehicle over a series of time steps.

By way of example, FIG. 2A shows an object A (208) to the forward-right of the vehicle 202 at time to. The sensing subsystems 204 can each generate a frame of sensor data for time to that captures information about the object A (208) in its current position.

Figure 2B:
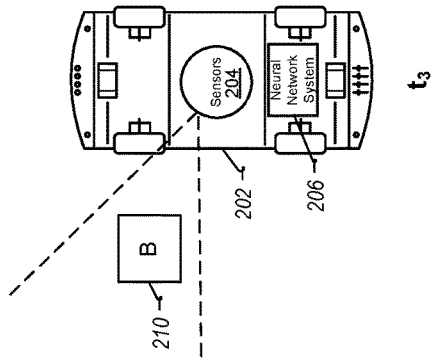

FIG. 2B shows that the object A (208) has moved relative to the vehicle 202 at time $t_1$ to a rear-right position of the vehicle's environment. The sensing subsystems 204 can each generate a frame of sensor data for time $t_1$ that captures information about the object A (208) in its current position.

Figure 2C:
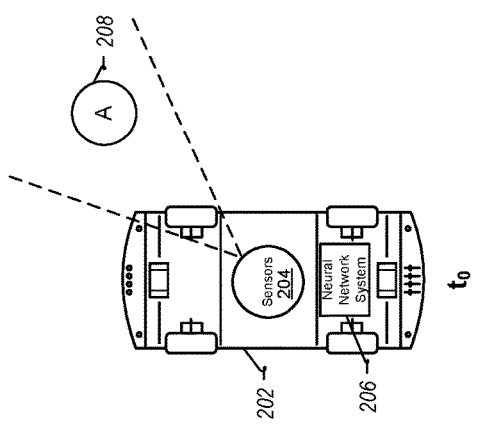

FIG. 2C shows that at time $t_2$, object A (208) remains in the same position relative to the vehicle 202 as at time $t_1$, but an additional object B (210) has now appeared in the vicinity of the vehicle 202. The sensing subsystems 204 can each generate a single frame of sensor data for time $t_2$ that captures information about both objects A (208) and B (210), or the sensing subsystems 204 can each generate separate frames of sensor data for time $t_2$ that separately captures information about objects A (208) and B (210). Further at time step $t_2$, the neural network system 206 can establish a new track for processing and classifying object B (210), and continue a separate track for processing and classifying object A (208).

Figure 2D:
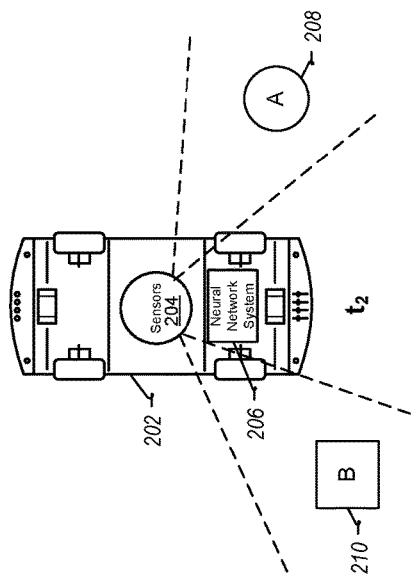

FIG. 2D shows that at time $t_3$, object A (208) is no longer in the vicinity of the vehicle 202 and object B (210) has moved relative to the vehicle to a front-left position of the vehicle's environment. The sensing subsystem 204 therefore generates frames of sensor data for time $t_3$ that captures information about object B (210). The neural network system 206 then processes the frames at time $t_2$ to continue the track for object B (210), but the track for object A (208) is ended.

Figure 3:
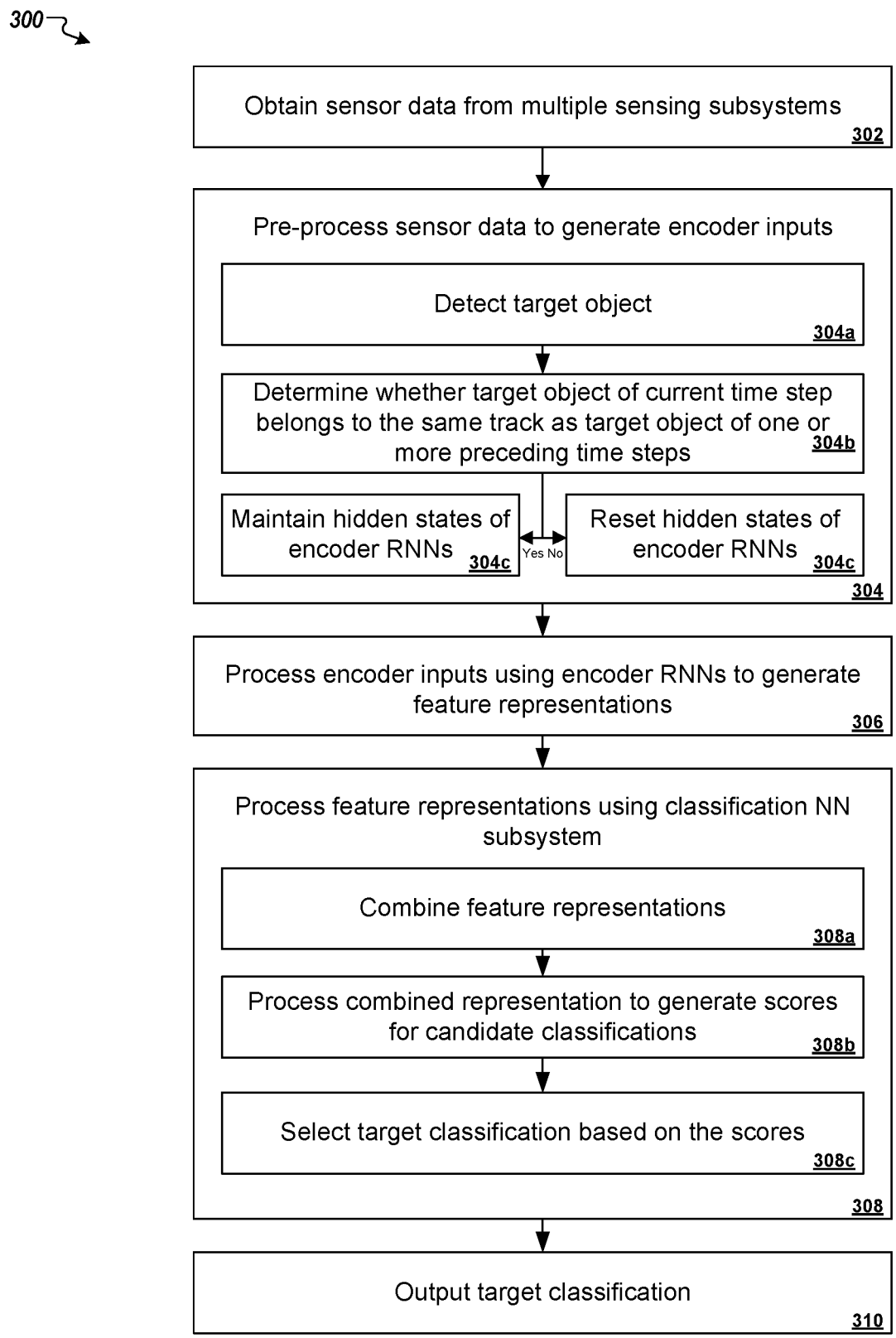
FIG. 3 is a flowchart of an example process for using a neural network system to process sequences of inputs derived from multiple sensing subsystems to generate one or more classifications of a target object represented by the inputs.

FIG. 3 depicts a flowchart of an example process 300 for generating a target classification for an object. The process 300 may be carried out by a neural network system such as the neural network system 100 of FIG. 1.

In some implementations, the neural network system is physically located on board a vehicle, e.g., an autonomous or semi-autonomous automobile. The neural network system may process data from one or more sensing subsystems that are also located on board a vehicle in order to generate classifications for objects that are detected within a vicinity of the vehicle (e.g., within 1, 5, 10, 15, or 25 meters of the vehicle).

It should be understood that the flowchart in FIG. 3 shows operations for determining a target classification of an object at just a single time step. As described further below, however, the process 300 may be extended to be iteratively performed for a sequence of time steps. For instance, the system may process new inputs at each time step in the sequence, and may generate a target classification of an object at one or more of the time steps.

At stage 302, the system obtains frames of sensor data from one or more sensing subsystems of the vehicle. Each sensing subsystem provides a respective channel of sensor data to the neural network system. If the vehicle has multiple active sensing subsystems, then at a given time step each of the sensing subsystems outputs a respective frame of sensor data for that time step. Each frame of sensor data indicates information about the environment surrounding the vehicle, including information about any objects currently located in the vicinity of the vehicle. For example, a LIDAR sensing subsystem may output a frame of sensor data characterizing the result of a sweep around at least a portion of the vehicle, a RADAR sensing subsystem may output a frame of sensor data characterizing the result of a sweep around at least the portion of the vehicle, and a camera sensing subsystem may output a frame of sensor data characterizing the result of a sweep around the at least the portion of the vehicle. The frames of sensor data from each of the sensing subsystems may be temporally aligned such that each frame of sensor data at a given time step represents the state of the vehicle's environment at substantially the same moment or interval of time.

At stage 304, a pre-processing subsystem of the neural network system processes the frames of sensor data from the sensing subsystems to generate encoder inputs that are suitable for processing by the system's encoder RNNs. In some implementations, pre-processing is optional and the encoder RNNs are configured to instead process the frames of sensor data directly without the frames having been transformed by the pre-processing subsystem.

In implementations where the frames of sensor data are pre-processed, the pre-processing subsystem may perform operations from one or more of the following sub-stages.

At sub-stage 304a, the pre-processing subsystem detects a target object that appears in the environment in vicinity of the vehicle as represented by the frames of sensor data. The target object is the object that is to be classified, which may be automatically selected by the neural network system or which may be selected based on user input. For example, the frames of sensor data may show eight objects in the vicinity of the vehicle. One of these objects can be designated the target object for which the system is to generate a classification.

In some implementations, the pre-processing subsystem crops the frames of sensor data to focus on the target object. When a frame is cropped, sensor data pertaining to the target object is maintained while sensor data that does not pertain to the target object is discarded (e.g., sensor data corresponding to a portion of a sweep that indicates information about objects other than the target object can be discarded). In some implementations, the pre-processing subsystem may perform one or more additional operations to transform the frames of sensor data into encoder inputs that can be suitably processed by the encoder RNNs.

At sub-stage 304b, the pre-processing subsystem determines whether the target object to be classified at the current time step is the same or different from the target object that was classified at a preceding time step. For example, the pre-processing subsystem may use an object detector to process one or more frames of sensor data at a current time step and, based on the processing, to generate a signature for the target object at the current time step. The signature for a target object at the current time step can be compared to the signatures of target objects that were generated at one or more preceding time steps. If the compared signatures are sufficiently similar (e.g., a score that indicates a measure of similarity of the signatures meets a threshold similarity score), then the target object at the current time step is deemed to be the same as the target object from the one or more preceding time steps. If the compared signatures are dissimilar (e.g., a score that indicates a measure of similarity of the signatures does not meet a threshold similarity score), then the target object at the current time step is deemed to be different from the target object from the one or more preceding time steps.

If the target object at the current time step is the same as the target object from the preceding time step, then at sub-stage 304c the system identifies that the inputs at the current time step are continuing a track from one or more preceding time steps, and therefore the internal states (e.g., hidden states) of the system's encoder RNNs are maintained from the preceding time step. If the target object at the current time step is different from the target object as the preceding time step, then the system at sub-stage 304d identifies that the inputs at the current time step relate to a new track, and therefore the internal states (e.g., hidden states) of the system's encoder RNNs are reset to default states.

At stage 306, the system uses one or more encoder RNNs to process the encoder inputs from the pre-processing subsystem and generate feature representations of the inputs. Generally, the system uses a separate encoder RNN to process the respective encoder inputs corresponding to each sensing subsystem. For example, a first encoder RNN may process the encoder input derived from sensor data provided by a LIDAR subsystem and a different, second encoder RNN may process the encoder input derived from sensor data provided by a camera subsystem.

To generate a feature representation of a given encoder input, the encoder RNN processes the encoder input to update the network's hidden state. If the encoder input is the first for a track, the hidden state of the encoder RNN is updated from an initial state of the RNN, e.g., a default state. If the encoder input is a subsequent input in a sequence of inputs for the track, then the hidden state of the encoder RNN is updated from the hidden state that existed from a preceding time step.

The encoder RNNs of the neural network system may process the respective encoder inputs for each channel serially or in parallel. However, each encoder RNN generally only processes encoder inputs from one channel, i.e., encoder inputs that correspond to sensor data from one sensing subsystem.

At stage 308, the system processes the feature representations of the encoder inputs for the current time step to generate a classification for the target object. The operations at stage 308 can be performed by a classification neural network subsystem, e.g., classification neural network subsystem 108. In some implementations, the system uses the hidden states of the encoder RNNs that result from processing the encoder inputs for the current time step as the feature representations of the encoder inputs.

More particularly, to generate a classification for the target object, at sub-stage 308a the feature representations of each of the encoder inputs are first combined into a single combined representation of the inputs. In some implementations, a combination subsystem, e.g., combination subsystem 110, generates the combined representation by concatenating the feature representations of the encoder inputs into a single representation that can be processed as a whole by a classification subnetwork.

At sub-stage 308b, the classification subnetwork, e.g., classification subnetwork 112, processes the combined representation of the inputs to generate scores for possible classifications of the target object. In some implementations, the classification subnetwork is a neural network that receives the combined representation at an input layer of the subnetwork and processes the combined representation using one or more hidden layers of the subnetwork to generate the scores. The classification subnetwork can include a softmax layer that applies a softmax function to the values of a last hidden layer of the subnetwork to generate the scores for the possible classifications of the target object.

The classification subnetwork may be trained to generate a respective score for each possible classification of a target object in a dictionary of possible classifications. For example, the dictionary of possible classifications may include pedestrian, vegetation, vehicle, building, traffic cone, and others. The score assigned to each of the possible classifications can indicate a likelihood that the respective possible classification is the true classification of the object.

At stage 308c, the system selects a target classification for the object at the current time step based on the scores. In some implementations, the possible classification whose score indicates the most likely match to the true classification is selected as the target classification for the object at the current time step.

At stage 310, the neural network system outputs the target classification. In some implementations, the target classification of an object is provided to one or more other systems of an autonomous or semi-autonomous vehicle. For example, the target classification can be used by an anti-collision system of an autonomous vehicle to determine vehicle maneuvers that would prevent collision with the target object. The target classification may be used by one or more other systems, e.g., to slow down or yield to pedestrians, maneuver around a cyclist, activate an adaptive cruise control to follow leading vehicles, or a combination of these. The target classification can be used offline to auto-label more log data, to argument the data for training other modules, and for other purposes.

In some implementations, the neural network system outputs more than just an indication of the most likely classification of an object. For instance, the neural network system can output an indication of the top n (e.g., 2, 3, 4, or more) possible classifications of an object according to the scores. For each classification that is selected as an output by the neural network system, the system can optionally provide a confidence score that indicates a probability of the classification being the true classification of the target object. By way of example, if a given target object cannot be readily distinguished based on the inputs to the system as being a pedestrian or foliage, the system may identify both 'pedestrian' and 'foliage' as possible classifications and may indicate a respective confidence score for each classification, e.g., 55-percent confidence for pedestrian and 45-percent confidence for foliage.

The operations described at stages 302-310 pertain to generating a classification for an object at a particular time step. In practice, however, the process 300 can be constantly repeated during operation of a vehicle. At each time step over a series of time steps during operation of the vehicle, the sensing subsystems of the vehicle may output new frames of sensor data for processing by the neural network system. At each time step, the respective frames of sensor data for the time step are converted to encoder inputs by the pre-processing subsystem, and each encoder RNN processes a respective encoder input to update the current hidden state of the encoder RNN. In some implementations, the system performs the operations at stages 308-310 to generate a target classification at every time step. In other implementations, the system performs the operations at stages 308-310 to generate a target classification at only some of the time steps, but not all. For example, the system may be configured to generate a target classification of an object only at the last time step of a given track or only after a threshold number of time steps have passed from the beginning of a track such that the encoder RNNs have processed a threshold number of encoder inputs before a classification is generated.

In some implementations, the system is configured to process separate tracks for multiple objects concurrently. Thus, if multiple objects are detected in the vicinity of a vehicle at the same time, the system can establish a respective track for each of the objects. The system can then generate classifications for multiple objects concurrently. In general, each track is processed separately from each other. For example, the hidden states of the encoder RNNs for one track are only updated by processing encoder inputs belonging to the track for one object, i.e., the hidden states of the encoder RNNs for one track are independent from and not used in any computations for another track.

Figure 4:
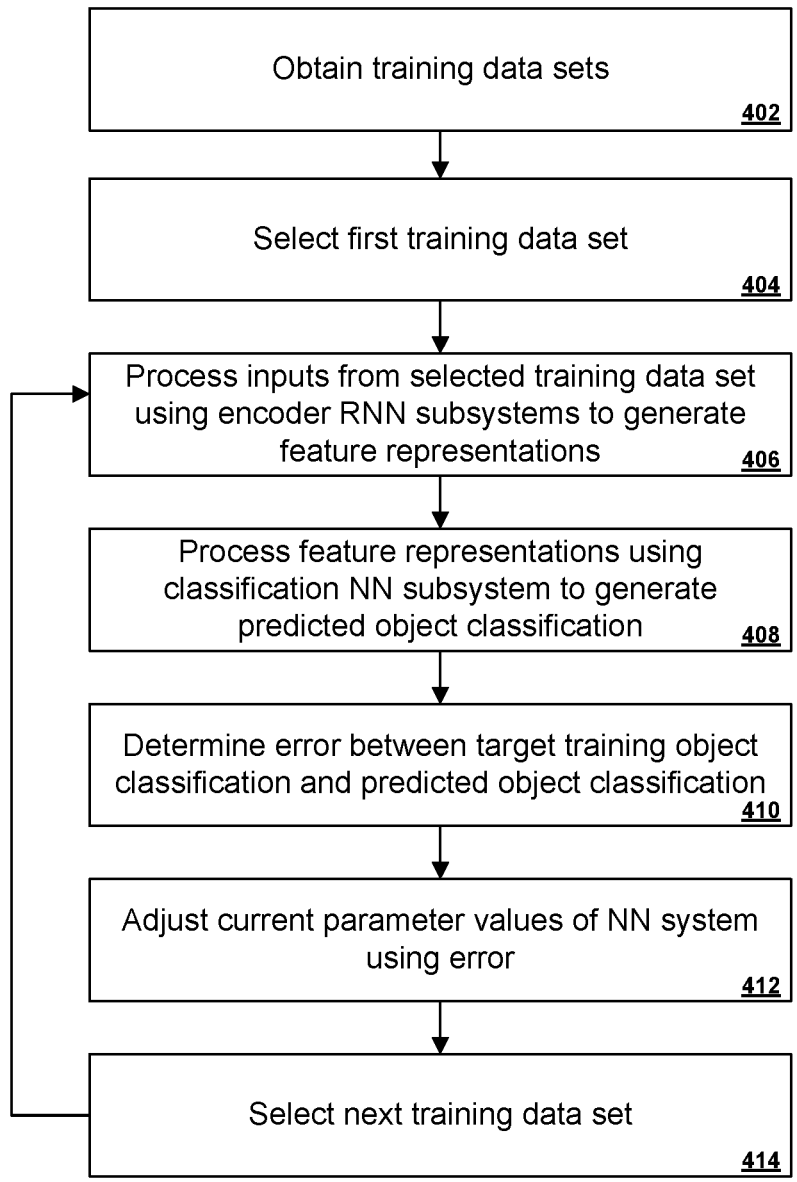
FIG. 4 is a flowchart of an example process for training a neural network system that processes sequences of inputs derived from multiple sensing subsystems to generate one or more classifications of a target object represented by the inputs.

FIG. 4 depicts a flowchart of an example process 400 for training a neural network system to generate classifications for an object, e.g., neural network system 100. The process 400 can be carried out by a neural network training system, which may be implemented as computer programs on one or more computers at one or more locations.

In some implementations, the training system uses an end-to-end approach to train both the encoder RNNs of the neural network system and the classification neural network subsystem together.

At stage 402, the training system obtains training data sets on which the neural network system will be trained. In some implementations, the training system uses hundreds, thousands, or even millions of training data sets to train the neural network system. Each training data set includes a set of training sequences and a training target classification. Each training sequence within a training data set includes a respective training input at each time step in a series of time steps. The training inputs for each of the training sequences in a training data set may all characterize information about the same target object, e.g., a tree, a house, a pedestrian, or a vehicle.

In some implementations, each training sequence within a training data set corresponds to a unique channel of sensor data and a corresponding sensing subsystem for the channel. For example, a first training sequence may include training inputs that characterize information about a target object sensed by a first sensing subsystem over a series of time steps, while a second training sequence in the training data set may include training inputs that characterize information about the target object sensed by a second sensing subsystem over the same series of time steps. The training inputs may be sensor data that focus on the target object or may be in the form of encoder inputs that a pre-processing subsystem has derived from sensor data from the sensing subsystems.

The training target classification of each training data set identifies the true classification of the target object represented by the training inputs of the training data set. All or some of the training data sets can be labeled with a training target classification based on human input that specifies the training target classification.

For a given training data set, each set of input sequences can have the same length as each other, i.e., each set of input sequences can have the same number of training inputs over the same series of time steps. The lengths of the input sequences for different training data sets may be different from each other. Additionally, the training target classifications of different training data sets may be different from each other. Generally, the training system uses many training data sets for each possible target classification in training the neural network system.

At stage 404, the training system selects a first training data set among the available training data sets. At stages 406 and 408, the training system then provides the selected training data set to the neural network system for processing in accordance with current values of the parameters of the neural network system. In particular, for each time step of the training sequences, at stage 406 the neural network system uses a respective encoder RNN for each training sequence to process the respective training inputs of the training sequences at the current time step to generate feature representations of the respective training inputs. At stage 408, for each time step of the training sequence, the neural network system uses a classification subsystem to combine (e.g., concatenate) the feature representations of the respective training inputs at the current time step and to select a predicted classification for the target object represented by the training inputs. The operations for generating feature representations of the training inputs and selecting a predicted classification are substantially similar to the corresponding operations described with respect to FIG. 3.

At stage 410, for each time step, the training system uses the training target classification of the training data set to determine an error between a target output and a predicted output generated by the neural network system. The training system can determine an error after each time step in a training sequence, in some implementations, rather than just at the end of the training sequence. At stage 412, the training system then adjusts the current parameters of the neural network system using the error at each time step. In some implementations, the training system uses conventional machine-learning techniques to train the neural network system, such as stochastic gradient descent with backpropagation through time. For example, the training system can backpropagate gradients to adjust current values of the parameters of the neural network system to optimize a loss function. The loss function may include loss terms associated with the output of the classification neural network at the track-level, and also loss terms at the sensor level by imposing a classification output based on each sensor-level encoder output.

At stage 414, the training system selects a next training data set and returns to stage 406 to train the neural network system on the selected set. The training system completes training of the neural network system once a training termination condition is satisfied or no further training data sets are available.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non transitory program carrier for execution by, or to control the operation of, data processing apparatus. Alternatively or in addition, the program instructions can be encoded on an artificially generated propagated signal, e.g., a machine-generated electrical, optical, or electromagnetic signal, that is generated to encode information for transmission to suitable receiver apparatus for execution by a data processing apparatus. The computer storage medium can be a machine-readable storage device, a machine-readable storage substrate, a random or serial access memory device, or a combination of one or more of them. The computer storage medium is not, however, a propagated signal.

The term "data processing apparatus" encompasses all kinds of apparatus, devices, and machines for processing data, including by way of example a programmable processor, a computer, or multiple processors or computers. The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a database management system, an operating system, or a combination of one or more of them.

A computer program (which may also be referred to or described as a program, software, a software application, a module, a software module, a script, or code) can be written in any form of programming language, including compiled or interpreted languages, or declarative or procedural languages, and it can be deployed in any form, including as a stand alone program or as a module, component, subroutine, or other unit suitable for use in a computing environment. A computer program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub programs, or portions of code. A computer program can be deployed to be executed on one computer or on multiple computers that are located at one site or distributed across multiple sites and interconnected by a communication network.

As used in this specification, an "engine," or "software engine," refers to a software implemented input/output system that provides an output that is different from the input. An engine can be an encoded block of functionality, such as a library, a platform, a software development kit ("SDK"), or an object. Each engine can be implemented on any appropriate type of computing device, e.g., servers, mobile phones, tablet computers, notebook computers, music players, e-book readers, laptop or desktop computers, PDAs, smart phones, or other stationary or portable devices, that includes one or more processors and computer readable media. Additionally, two or more of the engines may be implemented on the same computing device, or on different computing devices.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Computers suitable for the execution of a computer program include, by way of example, can be based on general or special purpose microprocessors or both, or any other kind of central processing unit. Generally, a central processing unit will receive instructions and data from a read only memory or a random access memory or both. The essential elements of a computer are a central processing unit for performing or executing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products. Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous.

What is claimed is:

1. A computer-implemented method for generating target classifications for an object from a set of input sequences, wherein each input sequence corresponds to a respective processing channel of a plurality of processing channels and defines a respective input for each of a plurality of time steps, the method comprising:

for each time step in the plurality of time steps after an initial time step and for each input sequence in the set of input sequences;
generating a respective feature representation for the input sequence by processing the respective input from the input sequence at the time step using a sequence generation model for the processing channel that corresponds to the input sequence,
wherein the sequence generation model that processes the respective input from the input sequence at the time step is conditioned on all inputs from the input sequence since the initial time step such that the respective feature representation generated at the time step is based on all inputs from the input sequence from the initial time step to the time step; and
processing a combined representation of the respective feature representations for the set of input sequences at a particular time step after the initial time step using a classification subsystem to select a target classification for the object at the particular time step.

2. The computer-implemented method of claim 1, wherein the plurality of processing channels each corresponds to a different one of a plurality of sensing subsystems, wherein the respective inputs of each input sequence characterize signals sensed by a respective sensing subsystem corresponding to the respective processing channel for the input sequence, the signals indicating information about the object.

3. The computer-implemented method of claim 2, wherein the plurality of sensing subsystems are physically coupled to an autonomous street vehicle and include at least one of a light detection and ranging (LIDAR) subsystem, a radio detection and ranging (RADAR) subsystem, or a photographic subsystem,
wherein the object is an object that has been detected as being within a sensing range of the autonomous street vehicle.

4. The computer-implemented method of claim 3, wherein the classification subsystem selects the target classification for the object at the particular time step from a group of candidate classifications that include two or more of a street sign, a vehicle, a pedestrian, a traffic cone, a facility, and vegetation.

5. The computer-implemented method of claim 1, wherein the classification subsystem selects a respective target classification for the object at each time step in the plurality of time steps.

6. The computer-implemented method of claim 1, wherein the classification subsystem delays outputting a target classification for the object until one or more time steps has passed after the initial time step.

7. The computer-implemented method of claim 1, wherein for each time step in the plurality of time steps after the initial time step and for each input sequence in the set of input sequences, generating the respective feature representation for the input sequence by processing the respective input from the input sequence at the time step using the sequence generation model for the processing channel that corresponds to the input sequence comprises updating a current hidden state of the sequence generation model based on the respective input from the input sequence at the time step,
wherein the respective feature representation for the input sequence at the time step is based on the updated hidden state of the respective sequence generation model at the time step.

8. The computer-implemented method of claim 1, further comprising determining that the object targeted for classification at one of the plurality of time steps is changed from the object targeted for classification at a preceding time step, and in response, resetting the sequence generation models so that the sequence generation models are no longer conditioned on any inputs for the object targeted for classification at the preceding time step.

9. The computer-implemented method of claim 8, wherein the sequence generation models each comprises a respective recurrent neural network (RNN), wherein resetting the sequence generation models comprises resetting respective hidden states of the RNNs.

10. The computer-implemented method of claim 1, wherein processing the combined representation of the respective feature representations for the set of input sequences at the particular time step to select a target classification for the object at the particular time step comprises:
  processing the combined representation with the classification subsystem including using a softmax layer to generate a respective score for each candidate classification in a set of candidate classifications; and
  selecting the target classification from the set of candidate classifications based on the scores.

11. The computer-implemented method of claim 1, further comprising:
  obtaining first data from a first of the plurality of processing channels at a first time step of the plurality of time steps;
  obtaining second data from the first of the plurality of processing channels at a second time step of the plurality of time steps, the second time step following the first time step;
  determining whether an object detected in the second data matches an object detected in the first data; and
  based on a determination that the object detected in the second data does not match the object detected in the first data, resetting states of the respective sequence generation models.

12. The computer-implemented method of claim 1, wherein the combined representation is further based on combining the respective feature representations for the set of input sequences with at least one additional feature describing a characteristic of the object, wherein the additional feature is determined separately from any of the sequence generation models.

13. The computer-implemented method of claim 12, wherein the at least one additional feature describes at least one of a length of the object, a width of the object, a speed of the object, or a height of the object.

14. The computer-implemented method of claim 1, wherein the respective sequence generation models for the plurality of processing channels comprise respective encoder recurrent neural network (RNN) subsystems that each includes a respective hidden state.

15. A system, comprising:
  one or more processors; and
  one or more non-transitory computer-readable media having instructions stored thereon that, when executed by the one or more processors, cause performance of operations for generating target classifications for an object from a set of input sequences, wherein each input sequence corresponds to a respective processing channel of a plurality of processing channels and defines a respective input for each of a plurality of time steps, the operations comprising:
    for each time step in the plurality of time steps after an initial time step and for each input sequence in the set of input sequences;
      generating a respective feature representation for the input sequence by processing the respective input from the input sequence at the time step using a sequence generation model for the processing channel that corresponds to the input sequence,
      wherein the sequence generation model that processes the respective input from the input sequence at the time step is conditioned on all inputs from the input sequence since the initial time step such that the respective feature representation generated at the time step is based on all inputs from the input sequence from the initial time step to the time step; and
    processing a combined representation of the respective feature representations for the set of input sequences at a particular time step after the initial time step using a classification subsystem to select a target classification for the object at the particular time step.

16. The system of claim 15, wherein the plurality of processing channels each corresponds to a different one of a plurality of sensing subsystems, wherein the respective inputs of each input sequence characterize signals sensed by a respective sensing subsystem corresponding to the respective processing channel for the input sequence, the signals indicating information about the object.

17. The system of claim 16, wherein the plurality of sensing subsystems are physically coupled to an autonomous street vehicle and include at least one of a light detection and ranging (LIDAR) subsystem, a radio detection and ranging (RADAR) subsystem, or a photographic subsystem,
  wherein the object is an object that has been detected as being within a sensing range of the autonomous street vehicle.

18. The system of claim 17, wherein the classification subsystem selects the target classification for the object at the particular time step from a group of candidate classifications that include two or more of a street sign, a vehicle, a pedestrian, a traffic cone, a facility, and vegetation.

19. The system of claim 15, wherein the classification subsystem selects a respective target classification for the object at each time step in the plurality of time steps.

20. The system of claim 15, wherein the classification subsystem delays outputting a target classification for the object until one or more time steps has passed after the initial time step.

* * * * *